United States Patent [19]
Thibodeau

[11] Patent Number: 5,131,538
[45] Date of Patent: Jul. 21, 1992

[54] FIBER OPTIC COIL SHIPPING AND STORAGE CONTAINER

[75] Inventor: Robert C. Thibodeau, Wakefield, R.I.

[73] Assignee: The United States of America as represented by the Secretary of the Navy, Washington, D.C.

[21] Appl. No.: 668,289

[22] Filed: Mar. 11, 1991

[51] Int. Cl.$^5$ .................. B65D 85/66; B65H 49/00
[52] U.S. Cl. .................. 206/389; 206/407; 206/413; 206/523; 206/414; 242/129
[58] Field of Search ............ 206/389, 407, 413, 414, 206/408, 403; 242/129

[56] References Cited

U.S. PATENT DOCUMENTS

| | | | |
|---|---|---|---|
| 3,013,378 | 12/1961 | Newton, Jr. | 206/389 X |
| 3,500,994 | 3/1970 | Gillespie | 206/389 |
| 3,512,633 | 5/1970 | Galan | 206/403 |
| 4,453,635 | 6/1984 | Heinzer et al. | 206/408 |

*Primary Examiner*—William I. Price
*Attorney, Agent, or Firm*—Michael J. McGowan; Prithvi C. Lall; Michael F. Oglo

[57] ABSTRACT

A shipping container for fiber optic coils includes a pair of semicircular body elements forming a generally circular body providing a circular chamber and having axially and outwardly extending flanges abutting along their mating edges thereof and radially extending projections at their axial ends. A pair of end caps have a cylindrical sidewall portion abutting the axial ends of the circular body, an end wall spaced therefrom, and radially extending projections aligned with those of the body. Fastening elements secure the flanges and projections in assembly. The container may be assembled about a coil supported on a winding mandrel by placing the two elements thereabout and securing the flanges to retain the coil therewithin. The body and coil may be removed from the winding mandrel and the end caps placed thereon. To remove the coil, one end cap is removed and the container aligned with the coil mounting fixture; the other cap is then removed and the coil moved outwardly of the body.

17 Claims, 3 Drawing Sheets

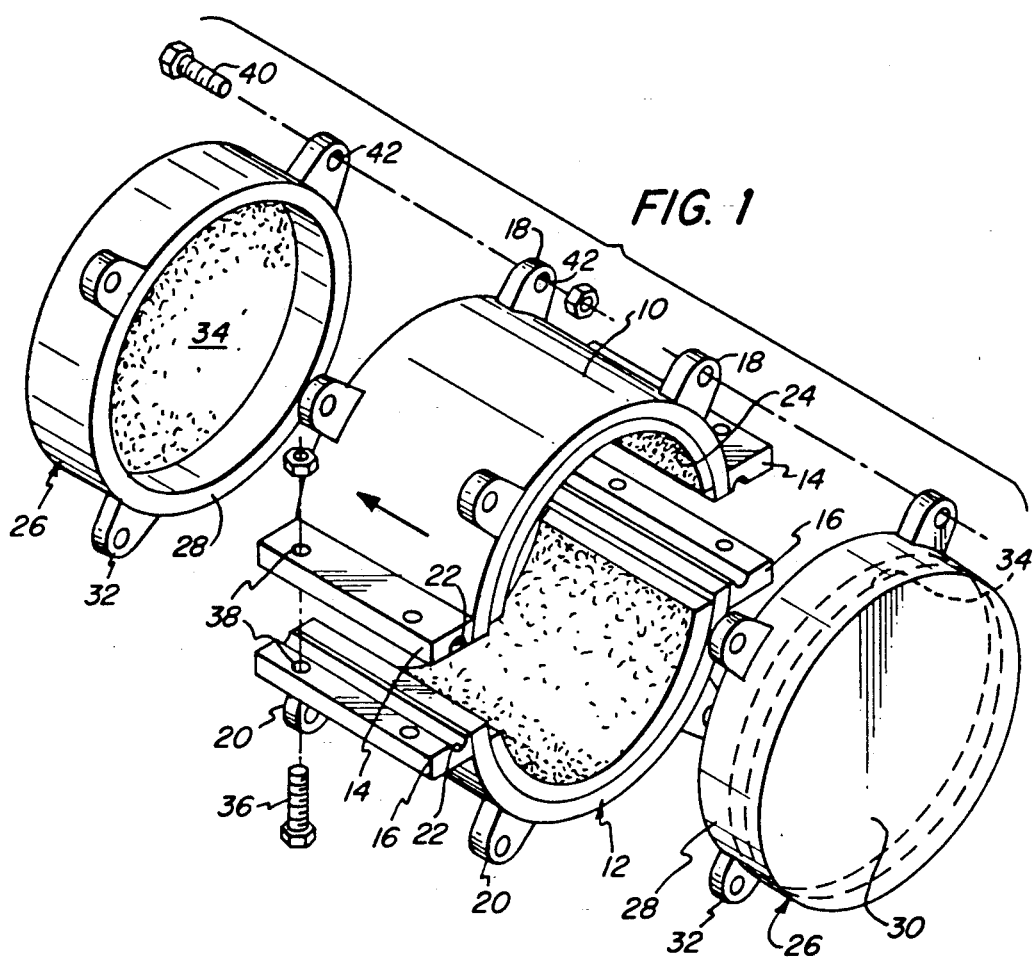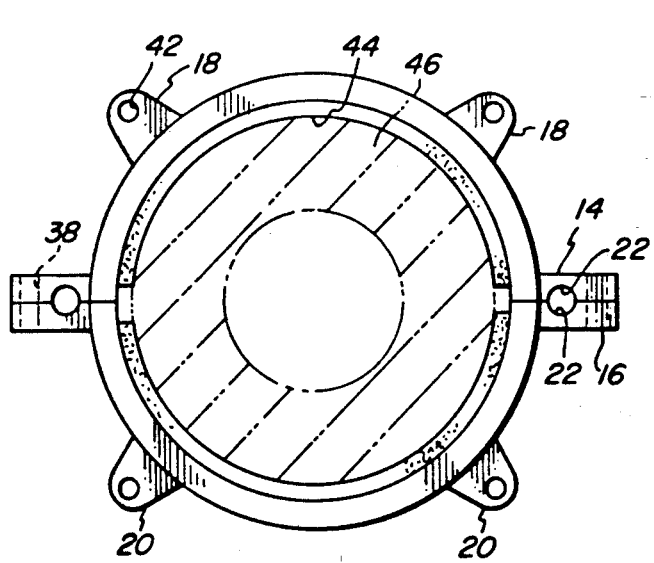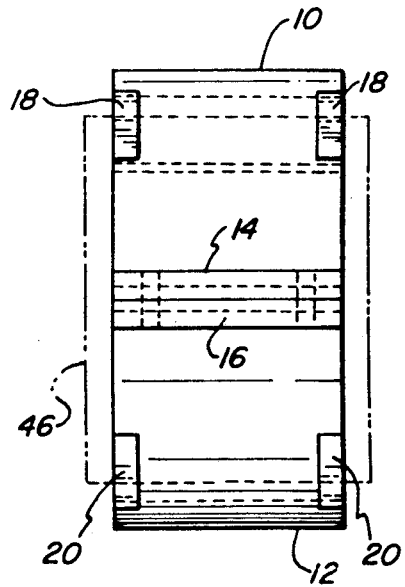

FIBER OPTIC COIL SHIPPING AND STORAGE CONTAINER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to shipping containers for delicate coiled materials and, more particularly, to such a container and a method for protecting a fiber optic coil during shipping and subsequently effecting its removal and placement in the mounting apparatus therefor.

(2) Statement of Prior Art

Fiber optics are now widely employed in many applications for the transmission of signals over long distances without substantial impairment of the quality of the signal. As a result, it is customary to produce the fiber optic cable in extended lengths of thousands of feet in order to minimize splices and their potential for interference with the quality of the signal being transmitted. Generally, the winding machines employed for coiling the fiber optic cable utilize a mandrel with winding flanges between which the cable is wound.

For obvious reasons, it is desirable to minimize any human or other contact with the cable which might transfer contaminants to the surface or which might otherwise adversely affect the cable. Similarly, it is extremely desirable to provide a shipping container for the coils which will protect the relatively fragile fiber optic cable from damage during the normal impacts which the shipping container may receive.

Because many coils do not employ flanges on the ends of the reel, it is extremely desirable to ensure that the axial ends of the coil are not subject to any forces which might damage or dislodge turns of the cable about the coil and this is also true during the installation of the coil on the payout device which will be used to feed the fiber optic cable from the coil for use.

It is an object of the present invention to provide a novel shipping container for fiber optic coils and the like which minimizes the potential for human contact with the coil during placement into the container and protects the coil from impacts occurring during shipment.

It is also an object to provide such a shipping container which may be fabricated and assembled readily and which may also be disassembled readily upon reaching the point of installation for the coil.

Another object is to provide a novel method for enclosing a fiber optic coil in a protective container for shipment without the necessity for touching the coil during such process of packaging, and thereafter for removing the coil from the container at the mounting location, again without touching the coil itself.

SUMMARY OF THE INVENTION

It has now been found that the foregoing and related objects may be readily attained in a shipping container for fiber optic coils comprising a pair of semicircular body elements forming a generally circular body with a circular chamber therein. The elements have axially and outwardly extending flanges abutting along the mating edges thereof and radially extending projections at the axial ends thereof disposed between the flanges. Mounted on the body are a pair of end caps having a cylindrical sidewall portion abutting the axial ends of the circular body and an end wall spaced therefrom. The sidewall portions have radially extending projections aligned with those of the body, and fastening elements secure the flanges in assembly. Other fastening elements secure the radially extending projections in assembly to secure the caps to the body.

Desirably, liners are provided on the inner surface of the body elements and on the inner surfaces of the end walls, and the liners are formed from resiliently compressible material.

In a preferred embodiment, the body includes alignment means to position the coil prior to its removal from the body member, and desirably the alignment means comprises axially extending channels formed by the mating surfaces of the flanges.

Generally, a pair of circumferentially spaced radial projections are provided at each axial end of each body element and four circumferentially spaced radial projections are provided on each of the caps.

In the method of using the package for packaging and transporting fiber optic coils, a fiber optic coil is supported on the winding mandrel, and the body elements are assembled about the coil and secured in assembly to form the body. The body and coil are removed from the winding mandrel, and the end caps are secured to the body as each mandrel and flange is removed to provide a shipping container containing the coil.

Generally, a coil winding machine has a mandrel upon which the coil is formed, and winding flanges are disposed on the mandrel. The flanges are removed prior to assembly of the end caps. The coil is of greater axial length than the body so that it projects outwardly of both ends thereof.

The coil is removed from the container by removing the cap from one end of the container, and positioning the shipping container at the location for use of the coil with the open end aligned with a mounting fixture. The other end cap is removed from the body member, and the body member is removed from the coil which remains on the mounting fixture.

The alignment means is used to position the coil prior to its removal from the body member, and the positioning step includes effecting engagement of the alignment means by inserting rods into the channels of the body.

BRIEF DESCRIPTION OF THE DRAWING

FIG. 1 is an exploded view of a shipping container for fiber optic coils embodying the present invention;

FIG. 2 is an end elevational view of the body member showing the fiber optic coil therewithin in phantom line;

FIG. 3 is a side elevational view of the body showing the fiber optic coil in phantom line;

DESCRIPTION OF THE PREFERRED EMBODIMENT

Figure 4:
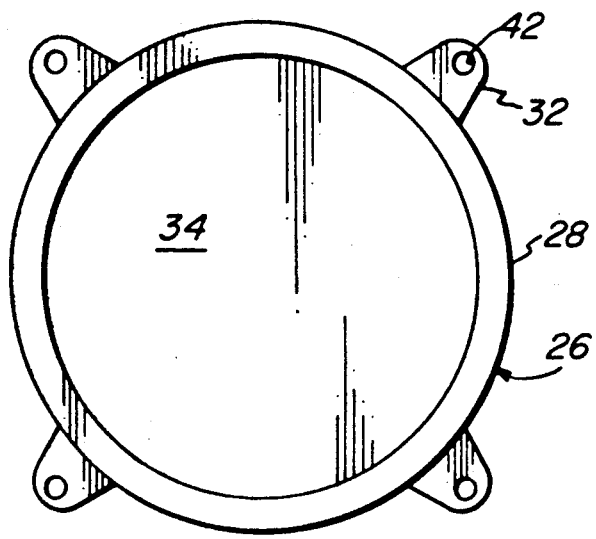
FIG. 4 is a plan view of one of the end caps.
Figure 5:
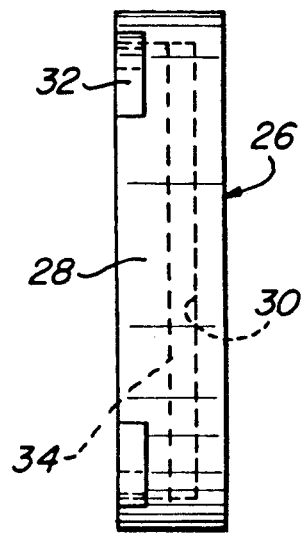
FIG. 5 is a side elevational view thereof.
Figure 6:
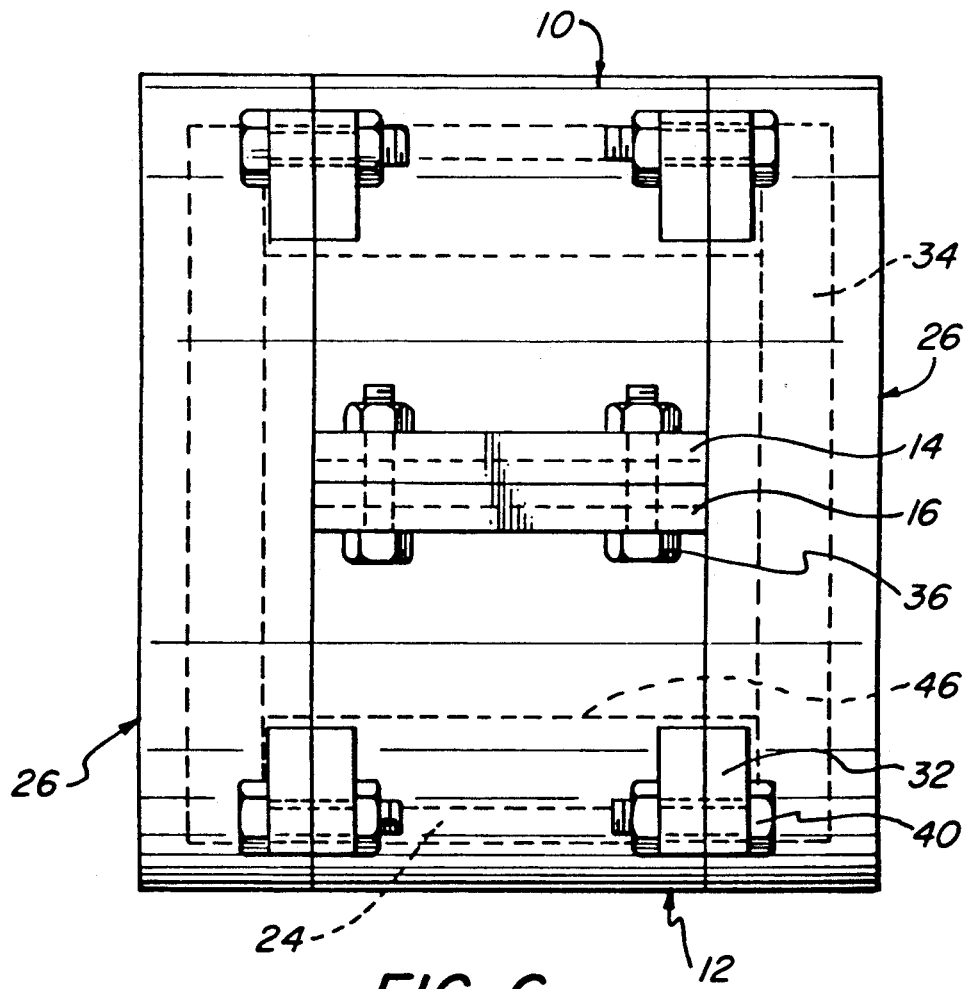
FIG. 6 is a side elevational view of the assembled container.

Turning first to FIGS. 1-6, therein illustrated is a fiber optic coil shipping and storage container embodying the present invention and comprised of a pair of generally semicircular body elements generally designated by the numerals 10, 12 with axially extending abutting flanges 14, 16 and radially outwardly extending projections 18, 20 at the axial ends thereof. The assembled body elements 10, 12 provide a cylindrical body with a storage chamber 44 of circular cross section therewithin. The abutting faces of the flanges 14, 16 have aligned axially extending semicircular grooves 22 which cooperate to provide a generally circular axial passage extending therethrough. On the inside surface of the body elements 10, 12 is a liner 24 of resiliently compressible synthetic resin foam material.

On each end of the body is an end cap generally designated by the numeral 26 and having a cylindrical sidewall 28 and an end wall 30. The sidewall 28 has radially outwardly extending projections 32 thereon which mate with the projections 18, 20 of the body elements 10, 12. on the inside surface of the end walls 30 is a liner 34 of resiliently compressible synthetic resin foam material.

The body elements 10, 12 are secured in assembly by fasteners 36 which extend through aligned apertures 38 in the flanges 14, 16. The end caps 26 are similarly secured to the body by the fasteners 40 which extend through aligned apertures 42 in the radial projections 32 and 18, 20.

As seen in FIGS. 2 and 3, seated in the chamber 44 of the container is a fiber optic coil 46.

Turning now to FIGS. 7A-7G, therein diagrammatically illustrated is the manner of storing the fiber optic coil 46 in the container and removing it therefrom.

Figure 7A:
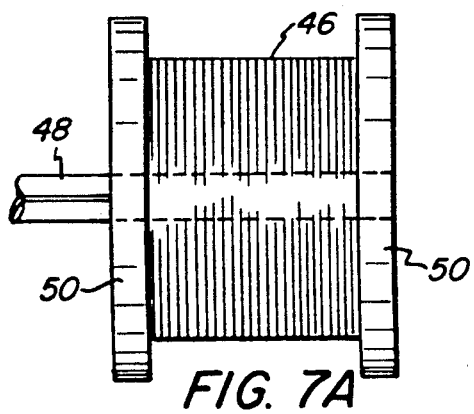
FIGS. 7A-7D are schematic views illustrating the several steps in the assembly of the shipping container about the fiber optic coil.

In FIG. 7A, the fiber optic coil 46 is seen as initially wound and supported upon the end of the mandrel 48 of a winding machine (not shown) and with the winding flanges 50 on the ends thereof. In FIG. 7B, the body elements 10, 12 have been placed thereabout, and they may be seen to be of shorter axial length than the coil 46 which projects from both ends of the body.

Figure 7E:
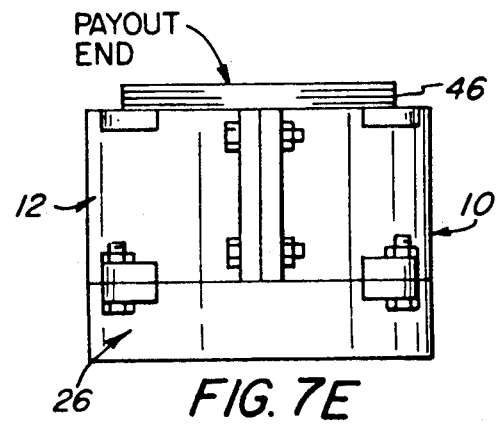
FIGS. 7E-7G are similar diagrammatic views showing the manner in which the fiber optic coil is positioned and removed from the shipping container at the point of mounting.
Figure 7B:
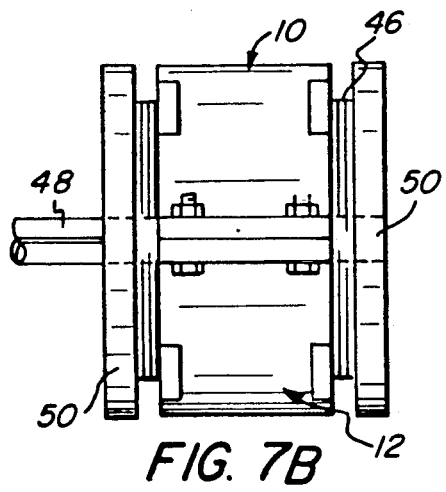
Figure 7F:
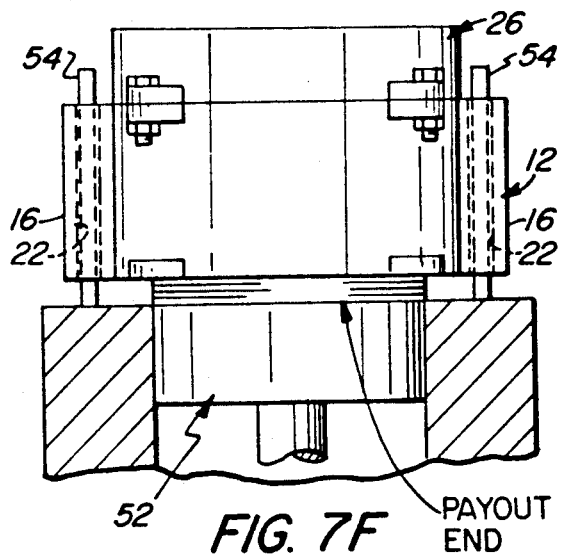
Figure 7C:
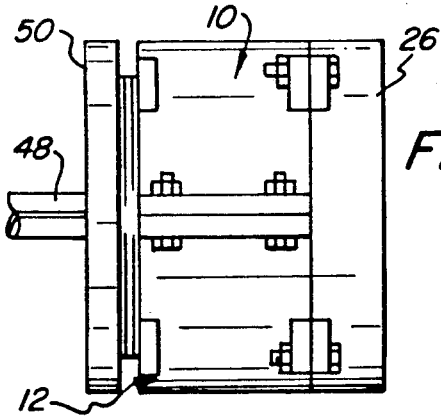
Figure 7D:
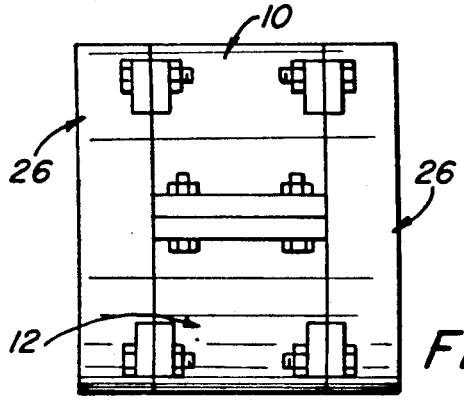

In FIG. 7C, the outer winding flange 50 has been removed and an end cap 26 has been mounted on the body. In FIG. 7D, the coil and body have been removed from the mandrel 48, and the other winding flange 50 has been removed and the other end cap 26 mounted to provide the shipping container.

Figure 7G:
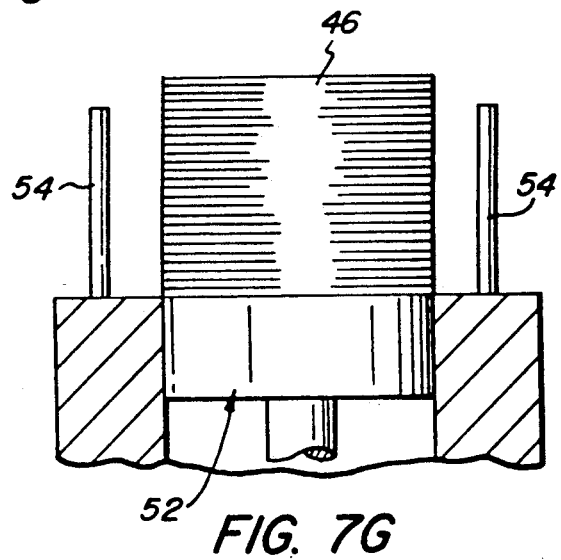

Beginning with FIG. 7E, the removal process is shown with one end cap (on the coil payout end) 26 having been removed at the place of installation. As seen in FIG. 7F, the container is then positioned on a mounting fixture generally designated by the numeral 52 and having a pair of rods 54 which extend into the passages of the flanges 14, 16 to precisely locate the coil 46. In FIG. 7G, the other end cap 26 has been removed and the body elements uncoupled to leave the coil 46 on the mounting fixture.

As can be seen, at no time has it been necessary to touch the fiber optic coil, either during loading or unloading at the point of installation. The material from which the body elements and end caps is fabricated is conveniently aluminum or steel although other metals and even reinforced plastics may be employed for this purpose. Whatever the material selected, the wall thickness should be sufficient to minimize the likelihood of penetration during impacts and to provide sufficient structural strength for handling the fairly heavy coils which are contained therewithin.

The size of the flanges is not of great significance although it is desirable that they be of sufficient thickness and width so as to provide secure assembly of the two halves, and further to provide the semicircular grooves for the channels which are utilized for centering the container at the point of installation.

The number and size of the radial projections on the body elements and on the end caps can vary so long as they are sufficient to ensure firm assembly of the end caps to the body.

The axial length of the body elements and of the sidewalls of the end caps may vary depending upon the size of the coil to be received therewithin. As previously indicated, the axial length of the body elements is generally shorter than the length of the coil to be received therein so as to facilitate its placement about the coil in the winding mandrel while the winding flanges are still mounted thereon and the amount of projection of the coil beyond the ends of the body elements will determine the axial length of the sidewall required to snugly seat without undue pressure the fiber optic coil within the assembled container.

The liners utilized on the inside surfaces of the body elements and of the end walls of the caps are generally formed from a closed cell resilient foam of synthetic resin such as polyurethane, although other materials providing impact absorption and avoiding contamination may also be employed. Conveniently, the liners are cut from sheet material of the appropriate dimensions and secured in place by adhesives or the like. If so desired, the liners need not encompass the entire inside surface of the side elements or of the end walls, but their dimensions should be sufficient to provide cushioning and spacing of the coil from the underlying surfaces of the container.

The actual configuration of the alignment passages in the side flanges may vary and if, so desired, additional aligning elements can be provided on the shipping container for different types of devices upon which the coil is intended to be mounted.

Thus, it can be seen from the foregoing detailed description and the attached drawings that the shipping container of the present invention is one which provides for secure and highly protective storage of the delicate fiber optic cable therewithin during shipment. It enables assembly of the container about the coil while it is still upon the winding mandrel, and it enables the removal of the coil therefrom without contact by human hands and without contact with the ends of the coil of fiber optic cable. The components of the container may be readily and economically fabricated, and the assembly process may be effected fairly simply and quickly.

What is claimed is:

1. A shipping container for fiber optic coils comprising:
   a pair of semicircular body elements forming a generally circular body with a circular chamber therein, said elements having axially and outwardly extending abutting flanges along the mating edges thereof and radially extending projections at the axial ends thereof and disposed between said flanges;
   a pair of end caps having a cylindrical sidewall portion abutting the axial ends of said circular body and an end wall spaced therefrom, said sidewall portions having radially extending projections aligned with those of said body;

fastening elements securing said flanges in assembly; and fastening elements securing said radially extending projections in assembly to secure said caps to said body.

2. The shipping container in accordance with claim 1 wherein included liners on the inner surface of said body elements.

3. The shipping container in accordance with claim 2 wherein there are included liners on the inner surfaces of said end walls.

4. The shipping container in accordance with claim 2 wherein said liners are formed from resiliently compressible material.

5. The shipping container in accordance with claim 1 wherein said body includes alignment means to position the coil prior to its removal from said body member.

6. The shipping container in accordance with claim 5 wherein said alignment means comprises axially extending channels formed by the mating surfaces of said flanges.

7. A shipping container for fiber optic coils comprising:

a pair of semicircular body elements forming a generally circular body with a circular chamber therein, said elements having axially and outwardly extending abutting flanges along the mating edges thereof and radially extending projections at the axial ends thereof disposed between said flanges, said body including alignment means to position the coil prior to its removal from said body member;

a pair of end caps having a cylindrical sidewall portion abutting the axial ends of said circular body and an end wall spaced therefrom, said sidewall portions having radially extending projections aligned with those of said body;

fastening elements securing said flanges in assembly;

fastening elements securing said radially extending projections in assembly to secure said caps to said body; and liners on the inner surface of said body elements and of the end walls of said caps.

8. The shipping container in accordance with claim 7 wherein said liners are formed from resiliently compressible material.

9. The shipping container in accordance with claim 7 wherein said alignment means comprises axially extending channels formed by the mating surfaces of said flanges.

10. In a method for packaging and transporting fiber optic coils, the steps comprising:

providing a shipping container comprising (i) a pair of semicircular body elements which, upon assembly, will form a generally circular body with a circular chamber therein, said elements having axially and outwardly extending abutting flanges along the mating edges thereof, and radially extending projections at the axial ends thereof disposed between said flanges, (ii) a pair of end caps having a cylindrical sidewall portion abutting the axial ends of said circular body and an end wall spaced therefrom, said sidewall portions having radially extending projections, and (iii) fastening elements for securing said flanges in assembly, and (iv) fastening elements for securing said radially extending projections in assembly to assemble said caps to said body;

supporting a fiber optic coil on a winding mandrel;

assembling said body elements about said coil and securing them in assembly to form said body;

removing said body and coil from said winding mandrel; and securing said end caps to said body to provide a shipping container containing said coil.

11. The fiber optic coil packaging and transporting method in accordance with claim 10 wherein winding flanges are disposed on the ends of said coil and wherein said flanges are removed prior to assembly of said end caps.

12. The fiber optic coil packaging and transporting method in accordance with claim 10 wherein said coil is of greater axial length than said body so that it projects outwardly of both ends thereof.

13. The fiber optic coil packaging and transporting method in accordance with claim 10 wherein the coil is subsequently removed from the shipping container by (i) removing the cap from one end of said container; (ii) positioning said shipping container at the location for use of said coil with the open end aligned with a mounting fixture; (iii) removing the other end cap from said body member; and (iv) removing said body member to leave the exposed coil on said mounting fixture.

14. The fiber optic coil packaging and transporting method in accordance with claim 10 wherein said body includes alignment means to position said coil prior to removal thereof from said body member, and wherein said positioning step includes effecting engagement of said alignment means with said mounting fixture.

15. The fiber optic coil packaging and transporting method in accordance with claim 14 wherein said positioning step includes inserting rods into a pair of longitudinal channels formed upon mating of said axially and outwardly extending abutting flanges along the edges of said pair of semicircular body elements upon assembly thereof.

16. The fiber optic coil packaging and transporting method in accordance with claim 10 wherein there are included liners on the inner surface of said body elements and on the inner surfaces of said end walls.

17. The fiber optic coil packaging and transporting method in accordance with claim 16 wherein said liners are formed from resiliently compressible material.

* * * * *